(12) United States Patent
Liao

(10) Patent No.: US 7,070,156 B2
(45) Date of Patent: Jul. 4, 2006

(54) ADJUSTABLE SECURING RACK FOR PLASMA TV

(76) Inventor: Jung Huang Liao, PO Box 82-144, Taipei (TW)

( * ) Notice: Subject to any disclaimer, the term of this patent is extended or adjusted under 35 U.S.C. 154(b) by 203 days.

(21) Appl. No.: 10/696,036

(22) Filed: Oct. 30, 2003

(65) Prior Publication Data

US 2005/0092890 A1    May 5, 2005

(51) Int. Cl.
*A47F 1/14* (2006.01)
(52) U.S. Cl. .................. 248/466; 248/225.21; 248/917
(58) Field of Classification Search ................ 248/466, 248/475.1, 476, 477, 480, 447.1, 220.43, 248/220.42, 225.21, 294.1, 274.1, 917, 919
See application file for complete search history.

(56) References Cited

U.S. PATENT DOCUMENTS

| | | | | |
|---|---|---|---|---|
| 1,815,767 A | * | 7/1931 | Fusmer ..................... | 248/475.1 |
| 3,759,297 A | * | 9/1973 | Anderson et al. ........... | 138/156 |
| 3,838,842 A | * | 10/1974 | McCracken .................. | 248/476 |
| 4,643,384 A | * | 2/1987 | Guerin ........................ | 248/476 |
| 6,102,348 A | * | 8/2000 | O'Neill ................. | 248/289.11 |
| 6,923,413 B1 | * | 8/2005 | Dozier ..................... | 248/294.1 |

* cited by examiner

*Primary Examiner*—Ramon O Ramirez
(74) *Attorney, Agent, or Firm*—Leong C. Lei

(57) ABSTRACT

An adjustable securing rack for plasma TV is disclosed. The securing rack is conveniently used for mount a plasma TV, allowing the TV to be adjusted in various positions and angle. The rack comprises a base seat, an adjusting plate and a suspension plate. The base seat has a base plate having circumferential edges being bent to form side plates, and the side plate surface of the top and bottom side edge is formed with at least one adjusting hole, and the two ends of the adjusting plate of the L-shaped steel are correspondingly mounted to the adjusting hole of the base seat so that the adjusting seat can move to the left and right side. The suspension plate is locked to the adjusting plate and is an L-shaped steel, and the corresponding side of the plasma TV has at least one adjusting hole for adjustment of the locking hole on the plasma TV.

2 Claims, 12 Drawing Sheets

US 7,070,156 B2

ADJUSTABLE SECURING RACK FOR PLASMA TV

BACKGROUND OF THE INVENTION (a) Technical Field of the Invention

The present invention relates to securing technique of a plasma TV, and in particular, a securing rack having a base seat including adjusting plate and suspension plate which are adjustable. Together with a suspension module, the plasma can be placed thereto and secured.

(b) Description of the Prior Art

The principle of plasma TV structure is alike fluorescent lamp, using two flat glasses with a very tiny gap in between to space apart very tiny straight cells and current is used to display image color. Each of the cells contains red, blue, green (three primary colors) fluorescent body, and a power source device. The UV radiation by passing through the gas with a current to stimulate the fluorescent body to produce image. Conventional TV employs CRT to display images to project onto a glass panel. Due to the need of a large image, a large electron gun is needed and he CRT will be very big. The advantages of a plasma TV is no matter how big is the image, the size, thickness is only ⅙ of the CRT. Further plasma TV can produce good quality image, can be suspended, 160 degree of vision, digital processing, no magnetic interference, no flickering, no radiation, this is different from the connection LCD TV, where the plasma TV has a larger size and a larger vision angle and image will not be stagnant. As a result of the advantages over the conventional CRT TV and LCD TV, the plasma TV manufacturers make plasma TV of various sizes, but there is no suspension rack for these plasma TV of various sizes. FIG. 12 is a conventional securing rack 80 for plasma TV comprising a lateral plate 81 having edges extended horizontally with a locking plate 82. There are locking holes 83 on the locking plate 82 to secure the plasma TV The disadvantages of the conventional rack are that only one size for a manufacturer and cannot be used for all the TV brands available in the market, secondly, the securing rack structure cannot be adjusted to comply to the decoration of the room. In other words, the elevation angle and the height of the rack cannot be adjusted.

SUMMARY OF THE INVENTION

Accordingly, it is an object of the present invention to provide an adjusted securing rack for plasma TV comprising a base seat, an adjustable plate and a suspension plate, wherein the base seat includes a base plate having the circumferential edge bent with a L-shaped edge plate and the circumferential face of the edge plate is provided with adjusting holes and the bottom seat is locked to concrete wall; the adjustable plate having a L-shaped cross-section having a top and bottom end provided with locking hole corresponding to the adjusting hole of the base seat, and the adjustable plate having an upright bottom end is provided with a screw hole and the top end is formed with at least one adjusting hole with the screw hole as the center, and the cross-section of the suspension plate is an L-shaped steel and the upright side plate has a top and a bottom end which respectively forms into downward opened top notch and bottom notch, and the horizontal side plate of the suspension plate is formed with a plurality of adjusting holes, thereby, horizontal adjusting holes on the side plate of the bottom seat are for the securing of the adjustable plate and the adjusting plate locks the suspension plate and a plasma TV is mounted to the suspension plate.

The foregoing object and summary provide only a brief introduction to the present invention. To filly appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
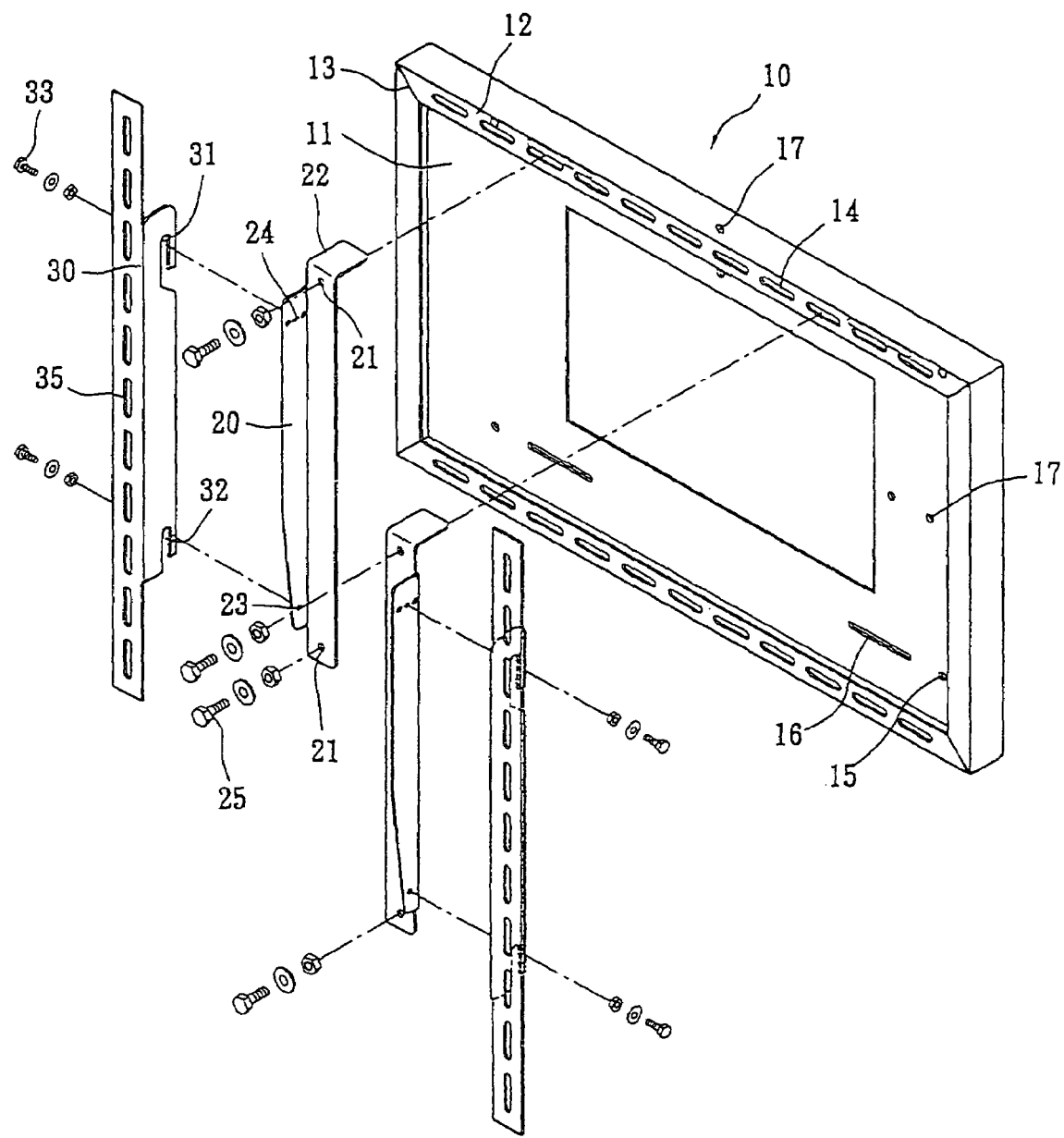
FIG. 1 is a perspective exploded view of the present invention, showing the various components of the securing rack.

Referring to FIG. 1, there is shown an adjustable securing rack for plasma TV The rack comprises a base seat 10, an adjusting plate 20 and a suspension plate 30.

Figure 2:
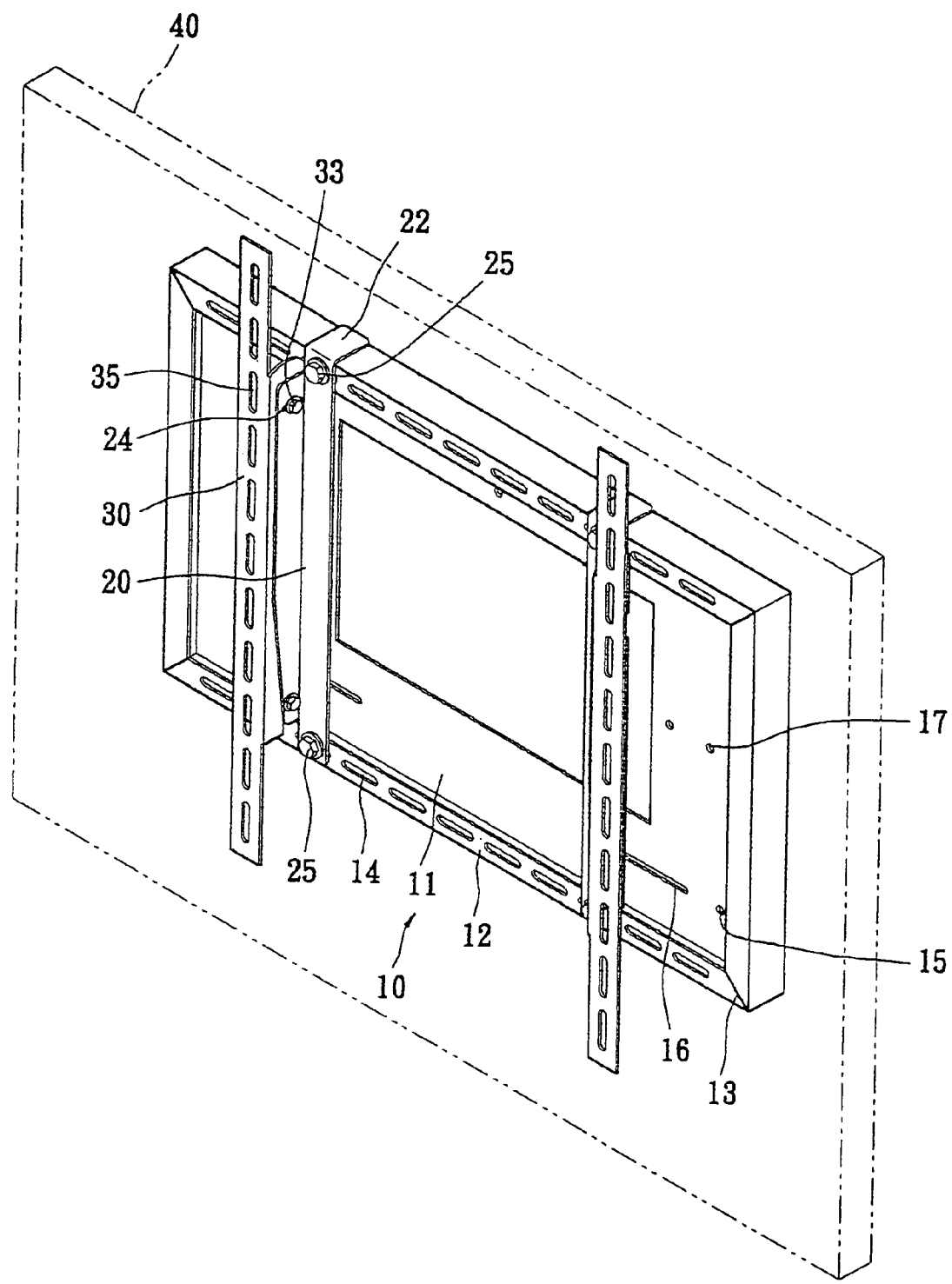
FIG. 2 is a perspective view of the present invention.
Figure 3:
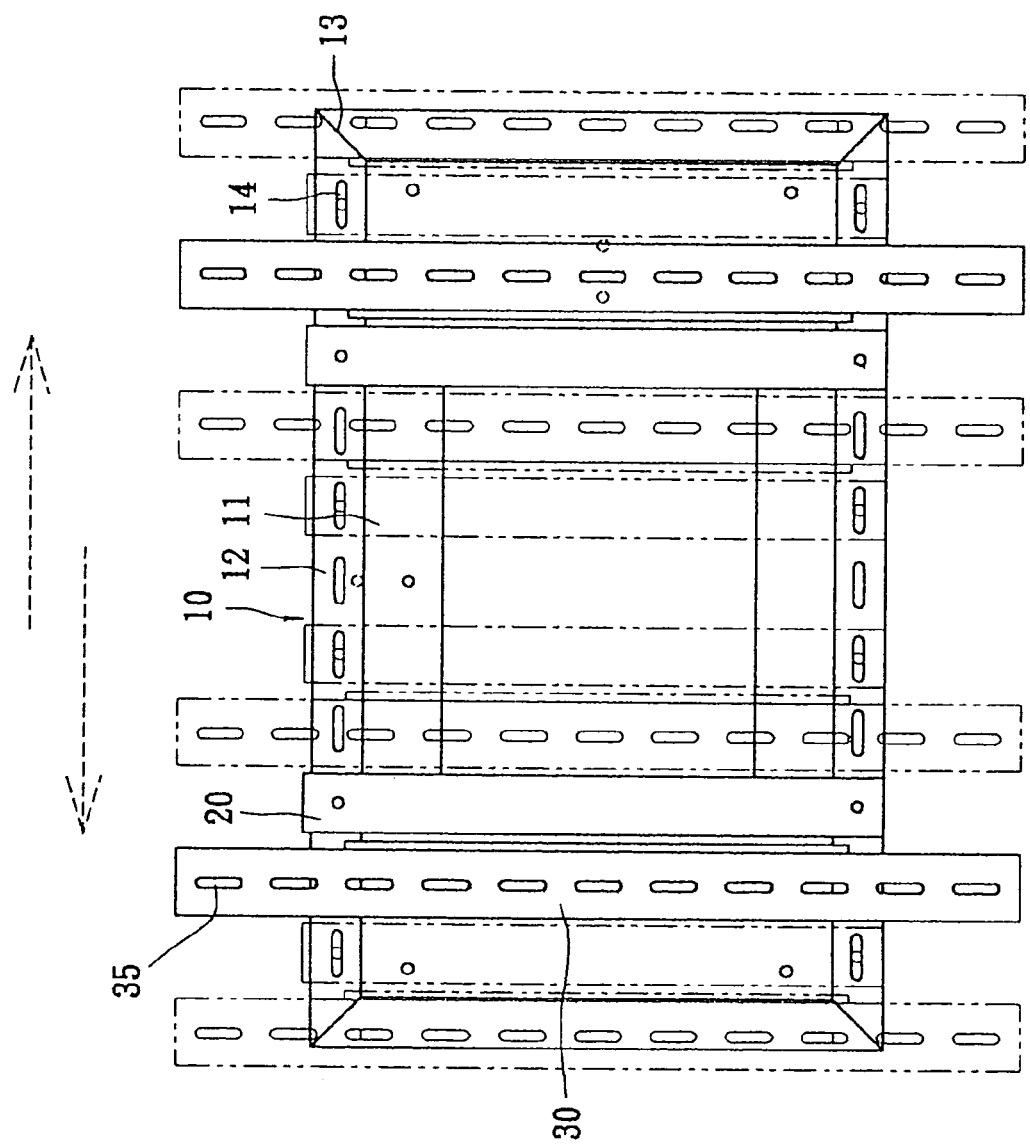
FIG. 3 is a schematic view showing the planar action of the rack in accordance with the present invention.
Figure 4:
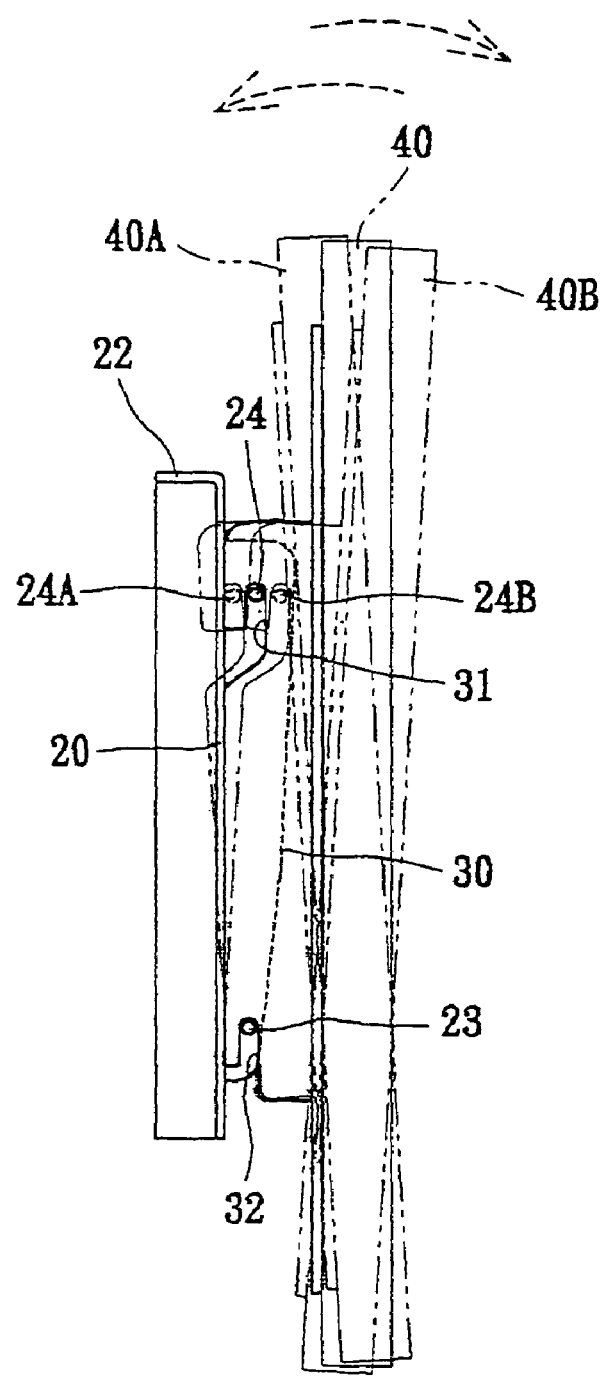
FIG. 4 is a schematic view showing the fine adjustment of elevation angle in accordance with the present invention.
Figure 5:
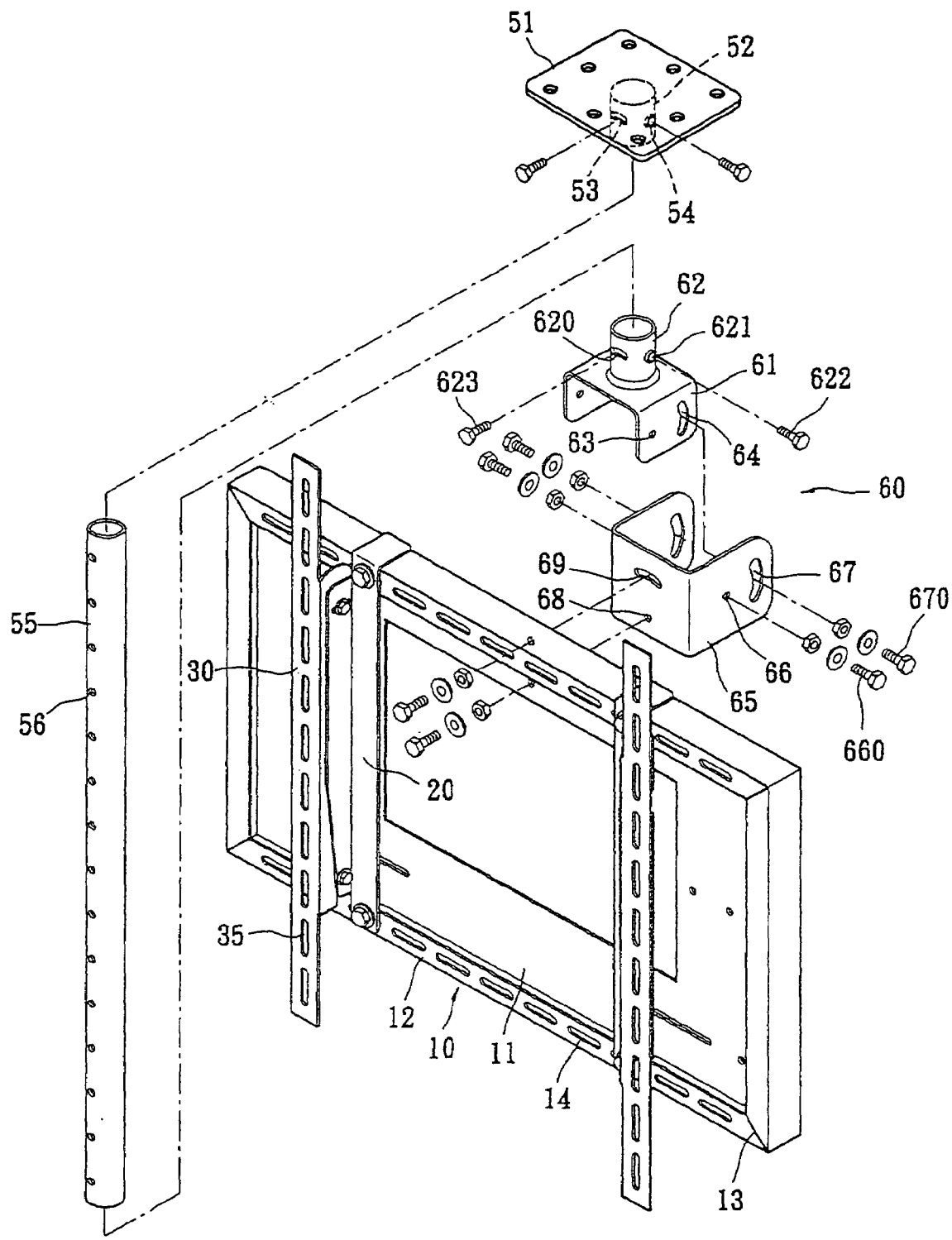
FIG. 5 is a perspective exploded view of another preferred embodiment of the present invention.

As shown in FIGS. 1 to 3, the base seat 10 has a base plate 11, and the edges of the base plate 11 bent in same direction to form L-shaped side plates 12 and the side plates 12 can be welded to form a connection slit 13 so that the edge of the base seat 10 is an arch-shaped structure so as to improve the entire strength of the base seat 10. The edge face of the top side plate and the bottom side plate of the base seat 10 is provided with a plurality of adjusting holes 14, preferably, a plurality of adjusting holes or elongated holes. Each corner of the base plate 11 is provided with a plurality of through holes 15 and elongated hole 16 and screw nuts and bolts are used to secure the bottom seat 10 to the concrete wall or wooden wall. Further, the base plate 11, at the horizontal axis and at the vertical axis, is provided with a plurality of through hole group 17 for the securing of a suspension module 50 (as shown in FIG. 5) for which the base seat 10 is suspended.

The horizontal side plate of the adjusting plate 20 having an L-shaped cross-section is provided with a locking hole 21, at the top and bottom end, corresponding to the adjusting hole 14 of the bottom seat 10. A screw bolt 25 is used to mount the adjusting plate 20 to the bottom seat 10 so as to facilitate the two adjusting plate 20 to correspond to the left-right adjustment position of the bottom seat 10. The top end of the adjusting plate 20 is connected to a leaning plate 22 and the leaning plate 22 urges the top face of the topside plate 12 of the bottom seat 10 to support the weight of the adjusting plate 20. Further, the adjusting plate 20 is an upright side plate having a bottom end being a shaft hole 23, and the upper end of the side plate has at least an adjusting hole 24 (three holes being provided in the preferred embodiment) with the shaft hole 23 as the center.

The suspension plate 30 has an L-shaped cross-section and the upright side plate having a top and a bottom end forming into an upper notch 31 and a lower notch 32 having a downward opening. A screw bolt 33 is corresponding to the adjusting hole 24 and the screw hole 23 of the adjusting plate 20 for mounting, and at the same time, facilitate the suspension of the suspension plate 30. Further, the surface of the horizontal side plate of the suspension plate 30, from top to bottom, is formed with at least an adjusting hole 35 for corresponding mounting with a plasma TV 40. The side plate 12 of the bottom seat 10 is provided with horizontal adjusting hole 14 for the locking of the adjusting plate 20, and the adjusting plate 20 can be used to suspend the suspension plate 30 having an adjusting hole 35 so that the plasma TV 40 can be mounted to the suspension plate 30. Thus, the structure can be formed into an adjustable securing rack for mounting a plasma TV.

Referring to FIGS. 1 to 3 again, the bottom seat 10 is locked to a concrete wall or a wooden wall and a locking screw bolt 25 is used to lock the adjusting plate 20 to the corresponding adjusting hole 14. The suspension plate 30 is locked to the adjusting plate 20 by means of the suspension bolt 33. Thus, when the user wants to lock the plasma TV 40, the locking screw blot 25 is loosen to adjust the left-right position of the two adjusting plate 20, and then adjust the screw bolt (not shown) on the suspension plate 30 corresponding to the plasma TV 40. Thus, the securing rack can be used for plasma TV 40 of various sizes.

The user can make adjustment of the adjusting hole 24 on the side plate of the adjusting plate 20 so as to adjust the inclination angle of the suspension plate 30. As a result the elevational angle of the plasma TV is adjusted. FIG. 5 is another preferred embodiment in accordance with the present invention. The through hole module 17 is mounted with a suspension module 50 including a suspension seat 51, a suspension rod 55 and an adjusting structure constituted from a securing seat and an adjusting seat 65.

The center of the suspension seat 51 mounted at the ceiling is extended downward to form a mounting tube 52 with circumferential edge being formed into a long-arch hole 53. The circumferential edge of the mounting tube 52 is a screw hole 54, which is used to mount the suspension rod 55 with an urging screw bolt. In addition, the circumferential edge of the suspension rod 55 is formed into a plurality of positioning holes 56 with a same axis. The positioning hole 56 is corresponding to the long arch hole 53 and is positioned by using a screw bolt so that the suspension rod 55 is restricted at the suspension seat 51.

The cross-sectional of the securing seat 61 is an arch-shaped and the center of the top face of the securing seat 61 is protruded to form a hollow mounting tube 62 for the insertion of the suspension rod 55. The circumferential edge of the mounting tube 62 is a long-arch hole 620 and a screw hole 621 is formed. An urging screw bolt 622 urges a suspension rod 55. In addition, the suspension rod 55 positioning hole 56 is corresponding to the long-arch hole 620 and a positioning screw bolt 623 is used to lock the suspension rod 55, and the adjusting structure 60 is limited to the suspension rod 55, and the two side plates of the securing plate 61 are respectively formed into corresponding shaft hole 63 and a long-arch slot 64 with the shaft hole 63 as the center so that the securing seat 61 is pivotally mounted to the adjusting seat 65.

The cross section of the adjusting seat 65 is an arch-shaped and the two side plates of the adjusting seat 65 can be mounted at the external side face of the two side plates of the securing seat 61. The two side plates are respectively formed with shaft hole 66 and long-arch slot 67 corresponding to the shaft hole 63 of the securing seat 61. The adjusting seat 65 can be finely adjusted by using the shaft holes 63, 66 and long-arch slots 64, 67 with respect to the securing seat 61.

At the same time, the end face of the adjusting seat 65 is formed with a shaft hole 68 and long-arch slot 69 corresponding to the through hole module 17 of the bottom seat 10 so that the bottom seat 10 can also be adjusted with respect to the adjusting seat 65. Therefore, the securing structure allows a plasma TV to be secured and adjusted, as shown in FIG. 6.

Figure 6:
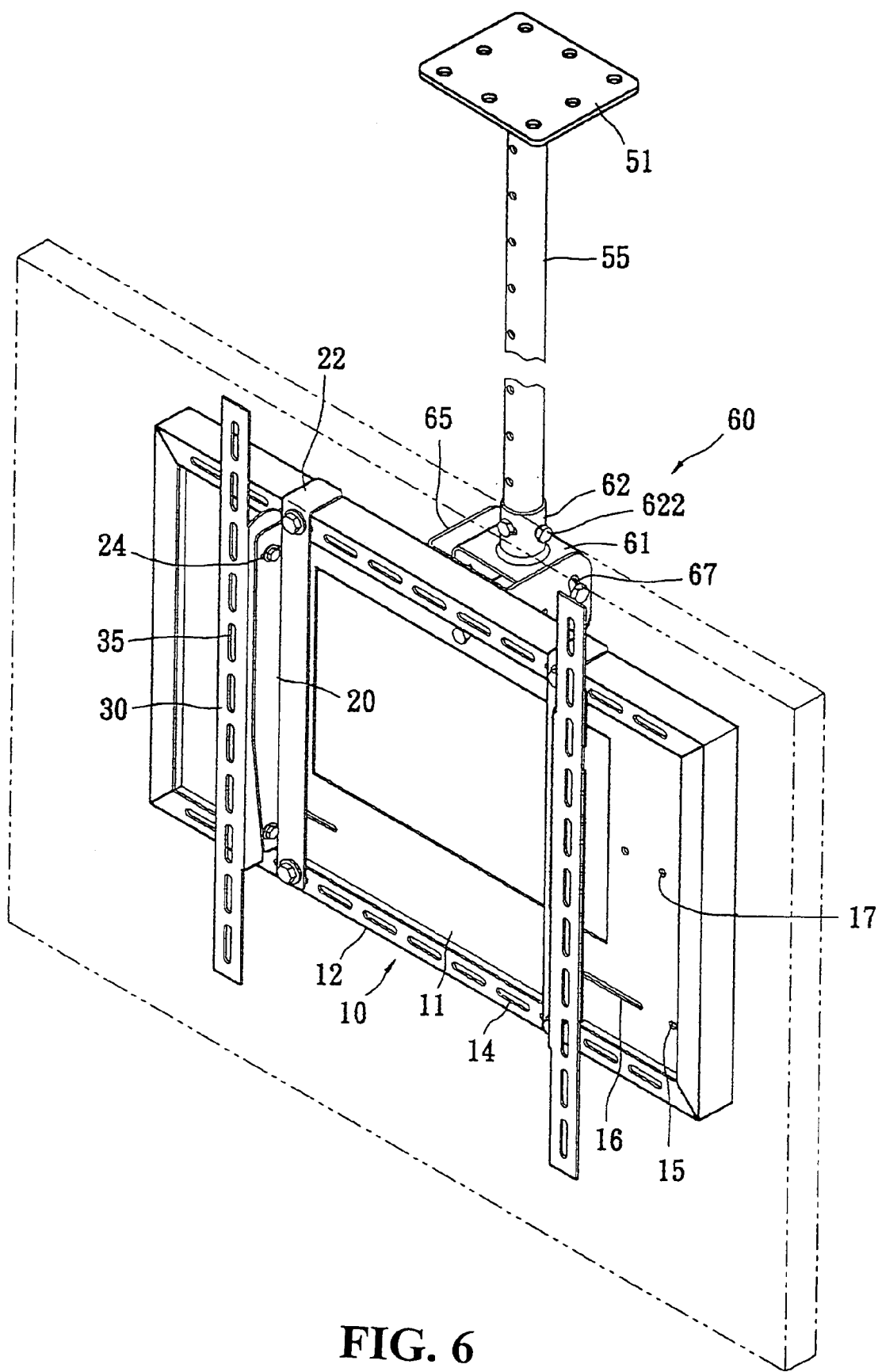
FIG. 6 is a perspective view of another further preferred embodiment of the present invention.

Another preferred embodiment of the present invention similar to that shown in FIG. 6, is that the base plate 11 has a through hole module 17 mounted to the adjusting seat 65. The suspension seat 51 is mounted to the ceiling and the two ends of the suspension rod 55 are locked to the suspension seat 51 and the securing seat 61 of the adjusting structure 60, allowing the entire plasma TV to be secured to the ceiling.

Figure 7:
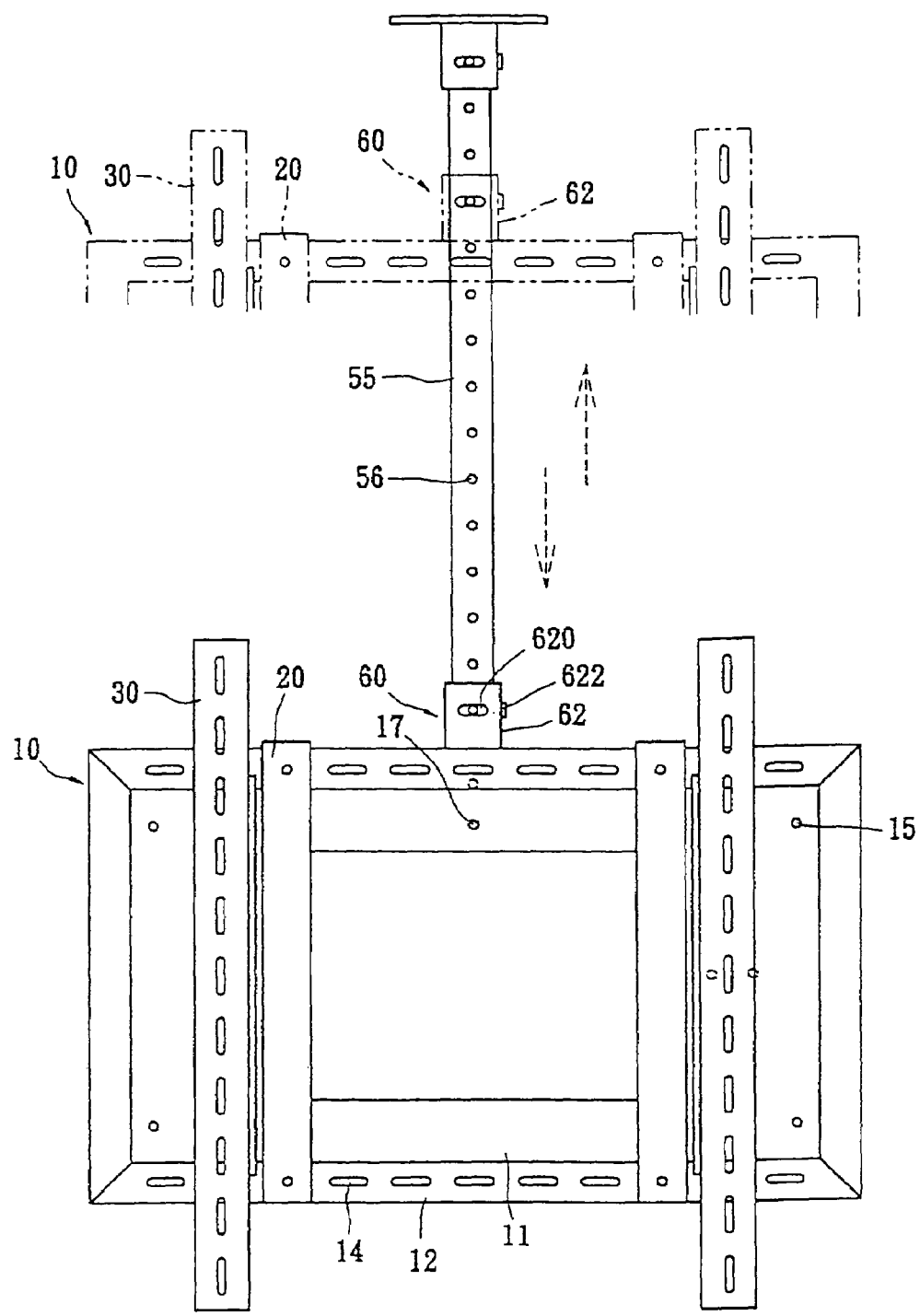
FIG. 7 is a schematic view showing the height adjustment in accordance with the present invention.

As shown in FIG. 7, when the height of the entire plasma TV 40 is to be adjusted, the urging screw bolt 622 and the positioning screw bolt on the securing 623 seat 61 is loosen, and the entire bottom seat 10 together with the adjusting structure 60 extended with a suspension rod 55 is slid to the required height, allowing the long-arch slot 620 of the mounting tube 62 to correspond to the positioning hole 56 and the positioning screw rod 623 passes through the long-arch slot 620 and then mounted to the positioning hole 56. Finally, the urging screw bolt 622 is locked tightly and required height of the plasma TV 40 is obtained.

Figure 8:
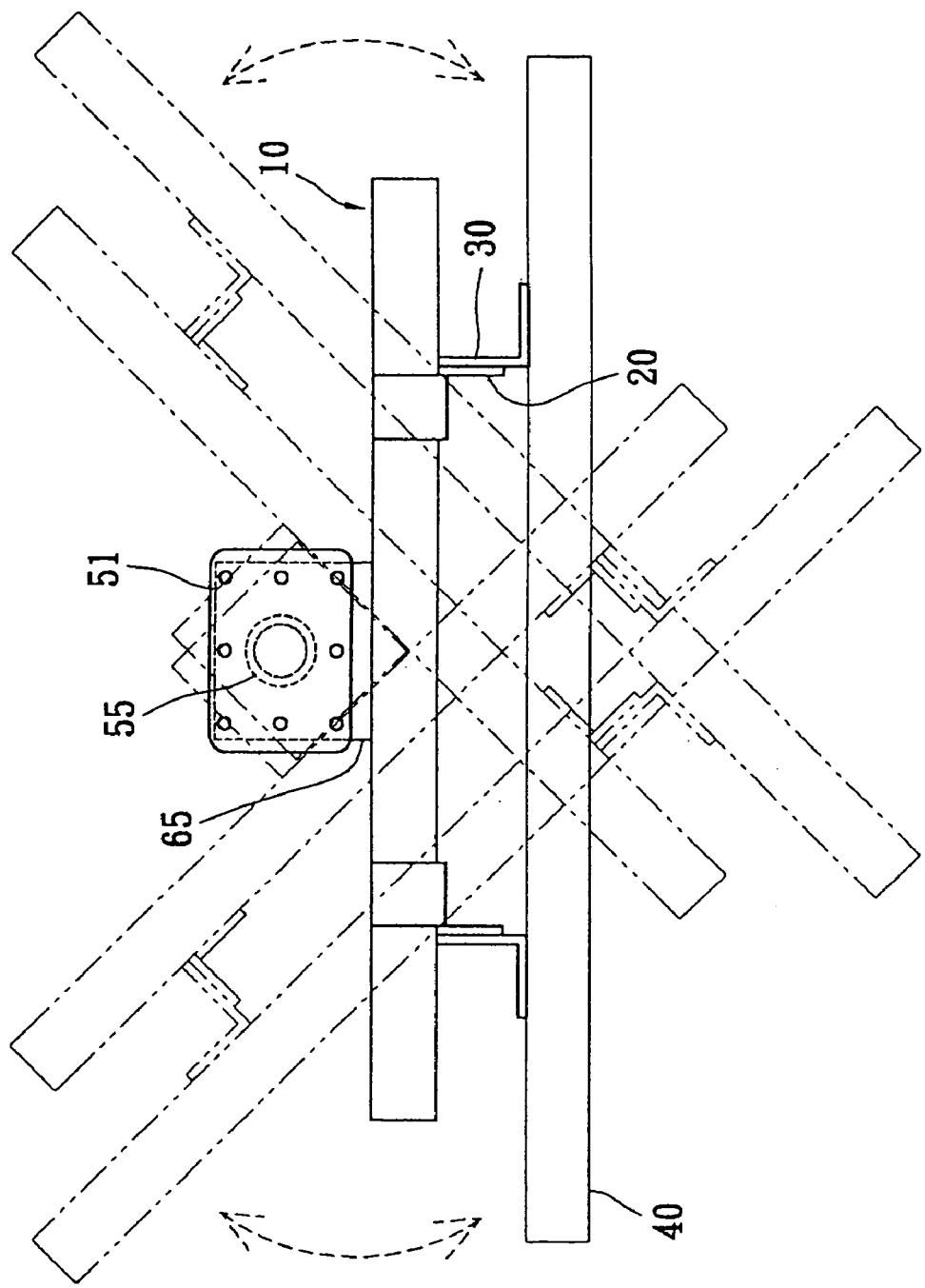
FIG. 8 is a schematic view showing the action of adjustment of the rotating angle in accordance with the present invention.
Figure 9:
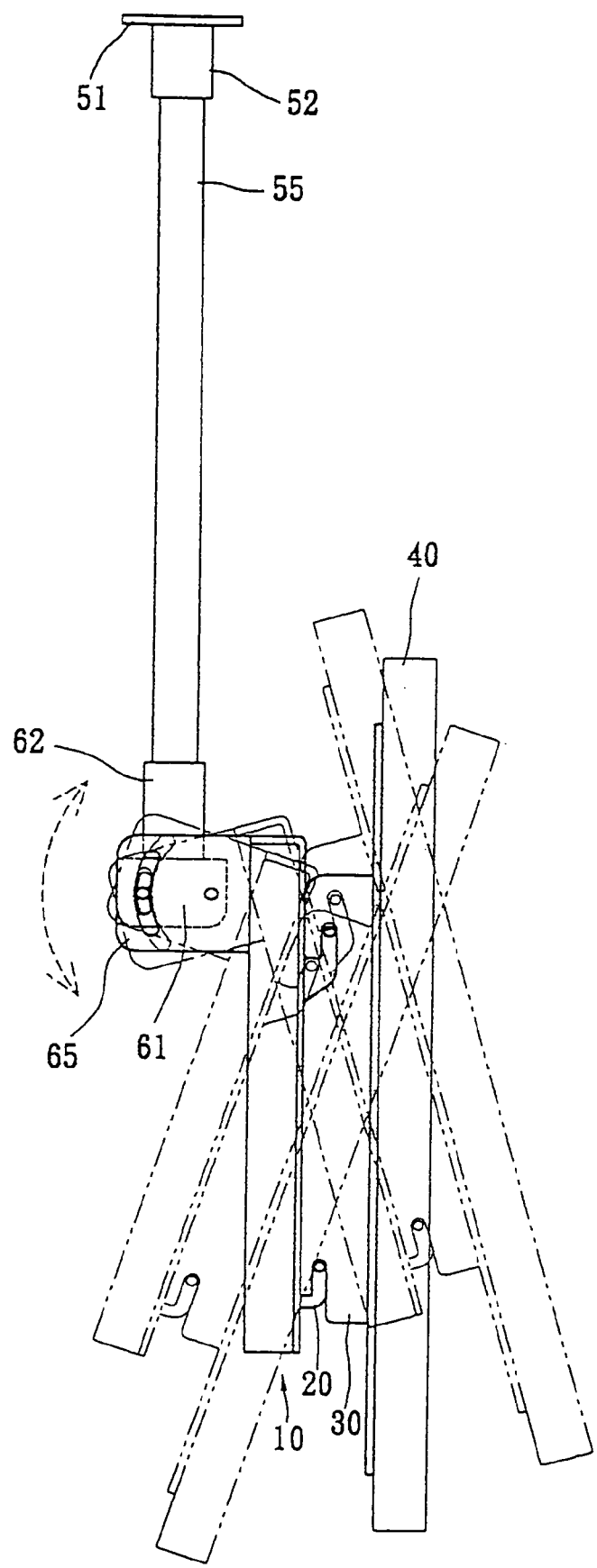
FIG. 9 is a schematic view showing the adjustment of elevation angle of the suspension module in accordance with the present invention.
Figure 10:
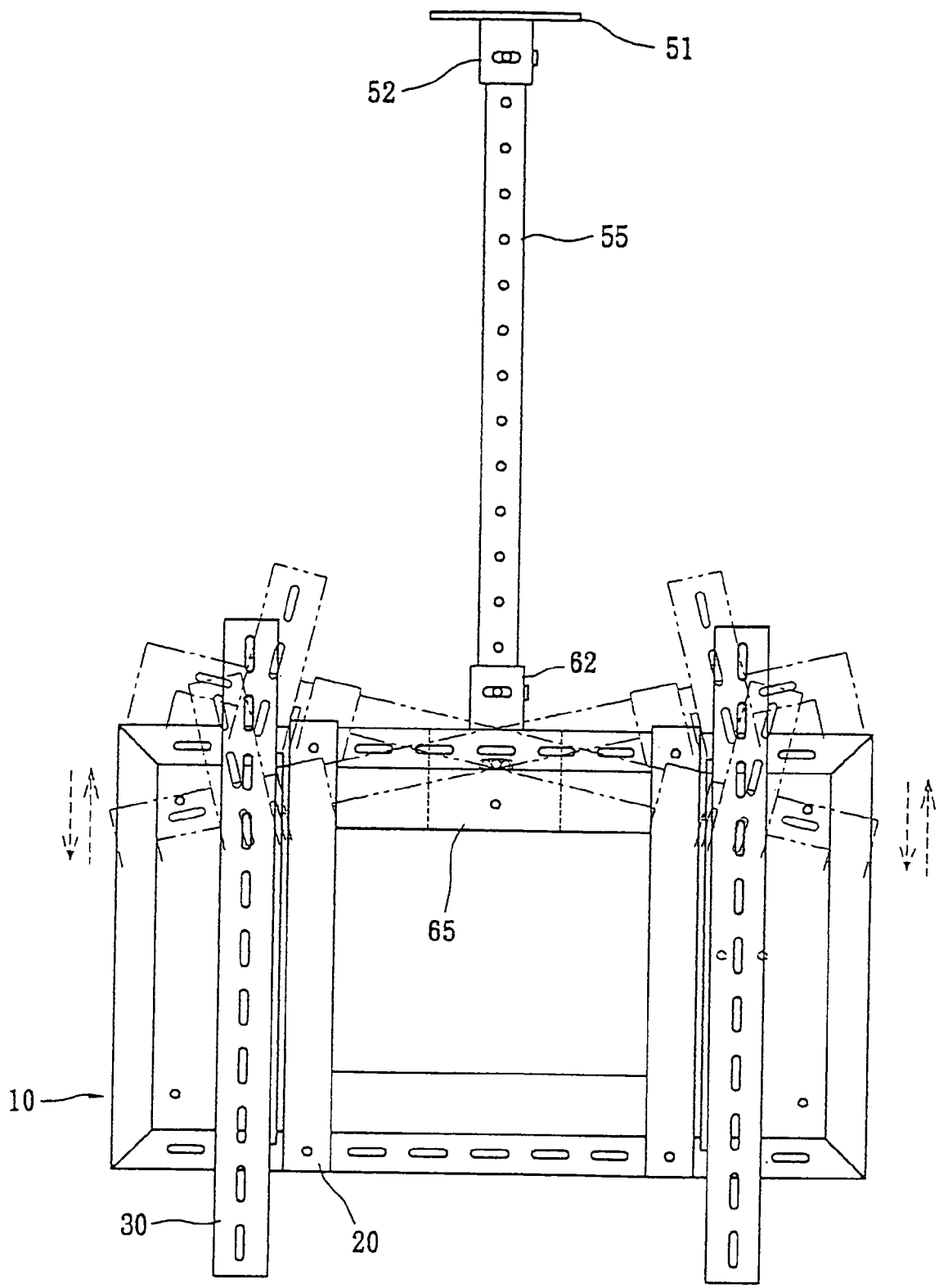
FIG. 10 is a schematic view showing horizontal angle adjustment in accordance with the present invention.
Figure 11:
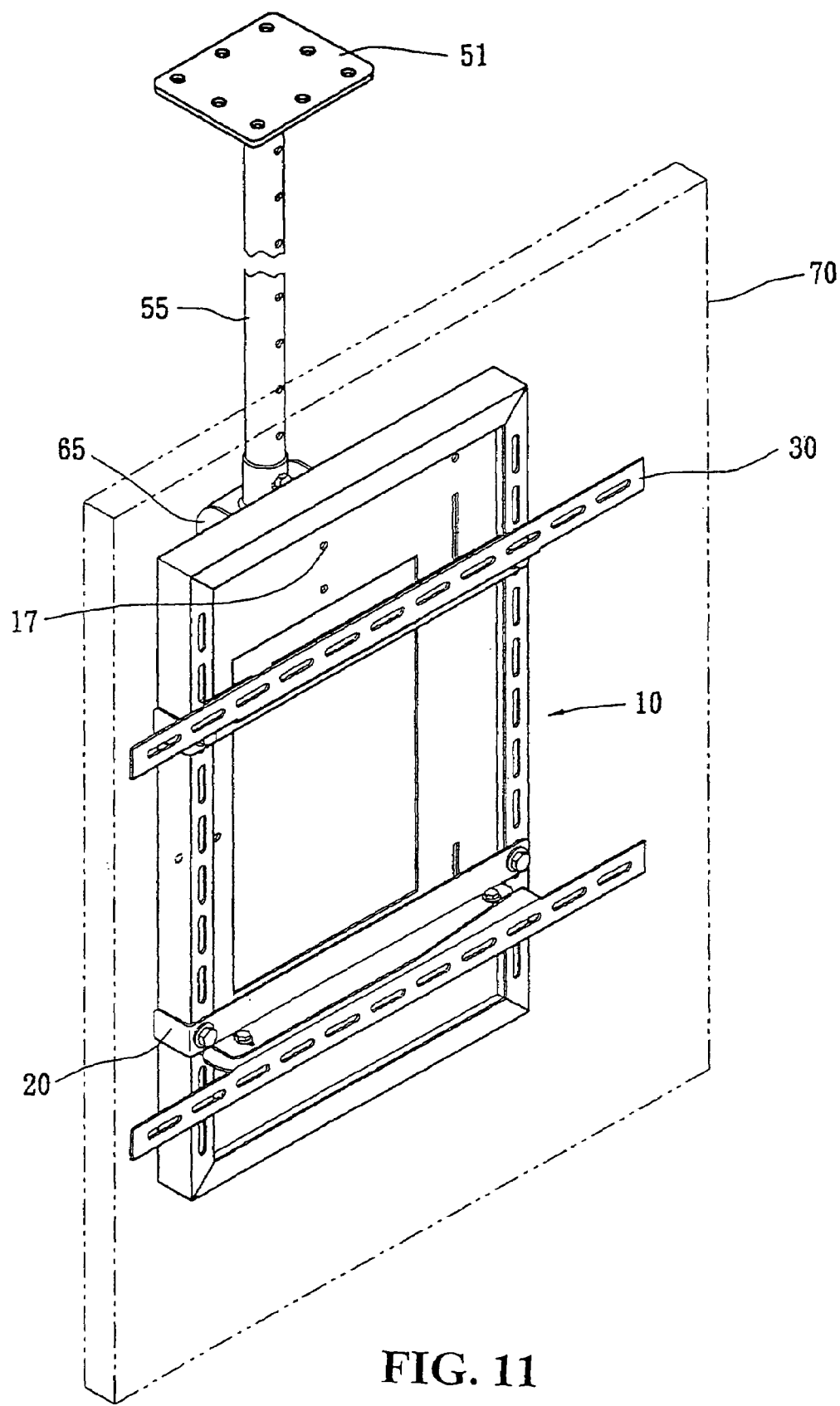
FIG. 11 is a schematic view showing another suspension method of the suspension module in accordance with the present invention.
Figure 12:
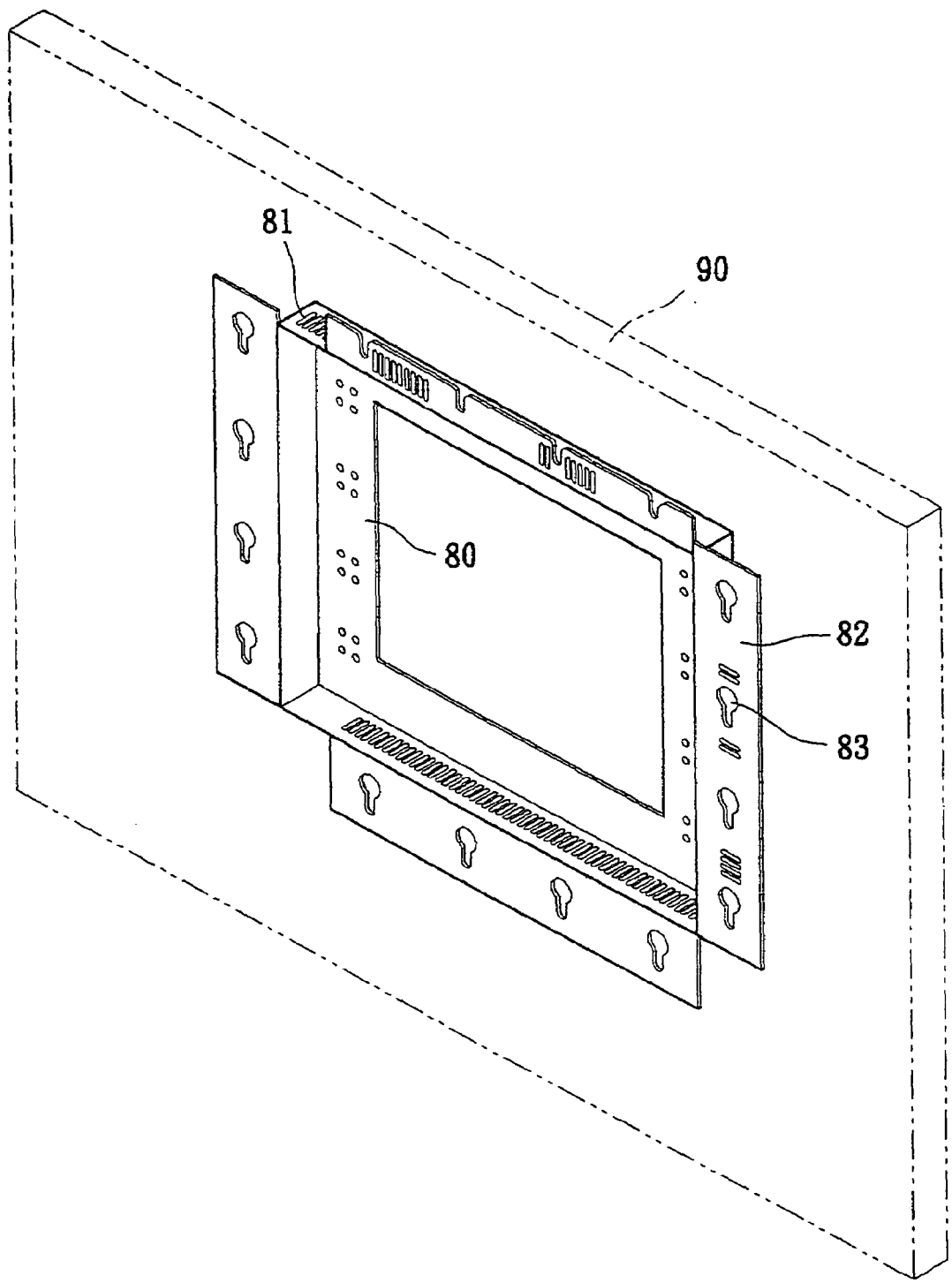
FIG. 12 is a perspective exploded view of the securing rack for plasma TV.

Referring to FIG. 8, the suspension seat 51 or the urging screw bolt 622 can be loosen and due to the restriction of the long-arch hole 53, 620 corresponding to the positioning screw bolt 623, the horizontal position can be adjusted. As shown in FIG. 9, the shaft screw rod 660 and the adjusting screw bolt 670 between the securing seat 61 and the adjusting seat 65 can be released, and the elevational angle can be adjusted. As shown in FIG. 10, the shaft screw rod and the adjusting screw bolt between the adjusting seat 65 and the bottom seat 10 can be adjusted so as to adjust the angle of the upright shaft, and the user can adjust the height and angle of the plasma TV in accordance with the decoration of the room to fulfill the requirement of the user. As shown in FIG. 11, the horizontal through hole module 17 of the bottom seat 10 is locked to the adjusting seat 65 of the adjusting structure 60 of the suspension module 50 to facilitate the mounting of the plasma TV 70.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An adjusted securing rack for a plasma TV comprising a base seal, an adjusting plate and a suspension plate, wherein the base seat includes a base plate having a circumferential edge bent into an L-shaped edge plate, a circumferential face of the L-shaped edge plate is provided with a plurality of adjusting holes, the adjusting plate has an L-shaped cross-section having a top and bottom ends provided with a plurality of locking holes corresponding to the adjusting holes of the L-shaped edge plate, the adjusting plate has an upright bottom end provided with a screw hole and a top end provided with at least an adjusting hole, the suspension plate has an L-shaped configuration defined by a first upright side plate and a second upright side plate, said first upright side plate has a plurality of adjusting holes, said second upright side plate has a downward opened top notch and a downward opened bottom notch, whereby the adjusting holes of the L-shaped edge plate secures of said adjusting plate, the adjusting plate locks the suspension plate, and a plasmas TV is adapted to be mounted to said suspension plate.

2. The securing rack as claimed in claim 1, wherein various corners of said base plate arc provided with a plurality of through holes and elongated holes for mounting onto concrete wall or wooden wall.

* * * * *